US010724142B2

(12) United States Patent
Masel et al.

(10) Patent No.: US 10,724,142 B2
(45) Date of Patent: *Jul. 28, 2020

(54) WATER ELECTROLYZERS EMPLOYING ANION EXCHANGE MEMBRANES

(71) Applicant: Dioxide Materials, Inc., Boca Raton, FL (US)

(72) Inventors: Richard I. Masel, Boca Raton, FL (US); Zengcai Liu, Boca Raton, FL (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,293

(22) Filed: Apr. 30, 2018

(65) Prior Publication Data

US 2019/0127863 A1 May 2, 2019

Related U.S. Application Data

(63) Continuation-in-part of application No. 15/406,909, filed on Jan. 16, 2017, now Pat. No. 9,982,353, which is a continuation-in-part of application No. 15/400,775, filed on Jan. 6, 2017, now Pat. No. 9,849,450, which is a continuation-in-part of application No. 15/090,477, filed on Apr. 4, 2016, now Pat. No. 9,580,824, which is a continuation-in-part of application No. 14/704,935, filed on May 5, 2015, now Pat. No. 9,370,773, which is a continuation-in-part of application No. PCT/US2015/014328, filed on Feb. 3, 2015, said application No. 14/704,935 is a continuation-in-part of application No. PCT/US2015/026507, filed on Apr. 17, 2015, application No. 15/967,293, which is a continuation-in-part of application No. 15/922,883, filed on Mar. 15, 2018, now abandoned, which is a continuation-in-part of application No. 15/406,909, filed on Jan. 16, 2017, now Pat. No. 9,982,353, which is a continuation-in-part of application No. 15/400,775, filed on Jan. 6, 2017, now Pat. No. 9,849,450, which is a continuation-in-part of application No. 15/090,477, filed on Apr. 4, 2016, now Pat. No. 9,580,824, which is a continuation-in-part of application No. 14/704,935, filed on May 5, 2015, now Pat. No. 9,370,773, which is a continuation-in-part of application No. PCT/US2015/014328, filed on Feb. 3, 2015, said application No. 14/704,935 is a continuation-in-part of application No. PCT/US2015/026507, filed on Apr. 17, 2015.

(Continued)

(51) Int. Cl.
*C25B 1/10* (2006.01)
*C25B 13/08* (2006.01)
*C25B 9/10* (2006.01)
*C02F 1/469* (2006.01)
*H01M 8/1023* (2016.01)
*C02F 1/461* (2006.01)
*H01M 8/1067* (2016.01)
*H01M 8/1018* (2016.01)

(52) U.S. Cl.
CPC ............ *C25B 1/10* (2013.01); *C02F 1/469* (2013.01); *C02F 1/46104* (2013.01); *C25B 9/10* (2013.01); *C25B 13/08* (2013.01); *H01M 8/1023* (2013.01); *H01M 8/1067* (2013.01); *C02F 1/46109* (2013.01); *C02F 2001/46142* (2013.01); *C02F 2201/46115* (2013.01); *H01M 2008/1095* (2013.01)

(58) Field of Classification Search
None
See application file for complete search history.

(56) References Cited

U.S. PATENT DOCUMENTS 1,628,190 A   5/1927  Raney
3,401,099 A   9/1968  McEvoy
(Continued)

FOREIGN PATENT DOCUMENTS

CN   106170339 A   11/2016
JP   S57119909 A   7/1982
(Continued)

OTHER PUBLICATIONS

Kutz et al, Sustainion Imidazolium-Functionalized Polymers for Carbon Dioxide Electrolysis, Energy Technology, vol. 5, No. 6, Dec. 2016, pp. 929-936 (Year: 2016).*
Leng et al, Supporting Information for Solid-State Water Electrolysis with an Alkaline Membrane, Journal of the American Chemical Society, vol. 134, No. 22, May 2012, pp. S1-S13 (Year: 2012).*
Wright et al, Hexamethyl-p-terphenyl poly(benzimidazolium): a universal hydroxide-conducting polymer for energy conversion devices, Energy & Environmental Science, vol. 9, No. 6, May 2016, pp. 2130-2142 (Year: 2016).*

(Continued)

*Primary Examiner* — Harry D Wilkins, III
(74) *Attorney, Agent, or Firm* — Cook Alex Ltd.

(57) ABSTRACT

Water electrolyzers employs base metal catalysts and an anion-conducting polymeric membrane with an area specific resistance at 60° C. in 1 M KOH below 0.037 ohm-cm$^2$. Preferably, the membrane comprising a polymer of styrene, vinylbenzyl-$R_s$ and possibly vinylbenzyl-$R_x$. $R_s$ is a positively charged cyclic amine group. $R_x$ is at least one constituent selected from the group consisting of —Cl, —OH, and a reaction product between an —OH or —Cl and a species other than a simple amine or a cyclic amine.

13 Claims, 1 Drawing Sheet

Related U.S. Application Data (60) Provisional application No. 62/066,823, filed on Oct. 21, 2014.

(56) References Cited

U.S. PATENT DOCUMENTS

| | | |
|---|---|---|
| 3,779,883 A | 12/1973 | Heit |
| 3,896,015 A | 7/1975 | McRae |
| 4,113,922 A | 9/1978 | D'Agostino et al. |
| 4,430,445 A | 2/1984 | Miyake et al. |
| 4,456,521 A | 6/1984 | Solomon et al. |
| 4,523,981 A | 6/1985 | Ang et al. |
| 4,921,585 A | 5/1990 | Molter |
| 5,883,762 A | 3/1999 | Calhoun et al. |
| 5,997,715 A | 12/1999 | Roberts et al. |
| 7,704,369 B2 | 4/2010 | Olah et al. |
| 8,138,380 B2 | 3/2012 | Olah et al. |
| 8,313,634 B2 | 11/2012 | Bocarsly et al. |
| 8,357,270 B2 | 1/2013 | Gilliam et al. |
| 8,414,758 B2 | 4/2013 | Deguchi et al. |
| 8,449,652 B2 | 5/2013 | Radosz et al. |
| 8,500,987 B2 | 8/2013 | Teamey et al. |
| 8,524,066 B2 | 9/2013 | Sivasankar et al. |
| 8,552,130 B2 | 10/2013 | Lewandowski et al. |
| 8,562,811 B2 | 10/2013 | Sivasankar et al. |
| 8,568,581 B2 | 10/2013 | Sivasankar et al. |
| 8,592,633 B2 | 11/2013 | Cole et al. |
| 8,658,016 B2 | 2/2014 | Lakkaraju et al. |
| 8,663,447 B2 | 3/2014 | Bocarsly et al. |
| 8,696,883 B2 | 4/2014 | Yotsuhashi et al. |
| 8,721,866 B2 | 5/2014 | Sivasankar et al. |
| 9,012,345 B2 | 4/2015 | Masel et al. |
| 9,255,335 B2 | 2/2016 | Kanan et al. |
| 9,370,773 B2 | 6/2016 | Masel et al. |
| 9,481,939 B2 | 11/2016 | Masel et al. |
| 9,580,824 B2 | 2/2017 | Masel et al. |
| 9,849,450 B2 | 12/2017 | Masel et al. |
| 9,943,841 B2 | 4/2018 | Masel et al. |
| 9,945,040 B2 | 4/2018 | Masel et al. |
| 9,982,353 B2 | 5/2018 | Masel et al. |
| 10,047,446 B2 | 8/2018 | Kaczur et al. |
| 2003/0049509 A1 | 3/2003 | Divisek |
| 2004/0023104 A1 | 2/2004 | Kohler et al. |
| 2007/0259236 A1 | 11/2007 | Lang et al. |
| 2008/0113244 A1 | 5/2008 | Yamashita et al. |
| 2009/0014336 A1 | 1/2009 | Olah et al. |
| 2009/0266230 A1 | 10/2009 | Radosz et al. |
| 2011/0114502 A1 | 5/2011 | Cole et al. |
| 2011/0201847 A1 | 8/2011 | Wolk et al. |
| 2011/0237830 A1 | 9/2011 | Masel |
| 2012/0119410 A1 | 5/2012 | Yan et al. |
| 2012/0171583 A1 | 7/2012 | Bocarsly et al. |
| 2012/0186446 A1 | 7/2012 | Bara et al. |
| 2012/0247969 A1 | 10/2012 | Bocarsly et al. |
| 2012/0308903 A1 | 12/2012 | Masel |
| 2013/0105304 A1 | 5/2013 | Kaczur et al. |
| 2013/0146448 A1 | 6/2013 | Wang et al. |
| 2013/0175181 A1 | 7/2013 | Kaczur et al. |
| 2013/0180865 A1 | 7/2013 | Cole et al. |
| 2013/0199937 A1 | 8/2013 | Cole et al. |
| 2014/0216934 A1 | 8/2014 | Fu et al. |
| 2014/0291163 A1 | 10/2014 | Kanan et al. |
| 2015/0171453 A1 | 6/2015 | Chikashige et al. |
| 2015/0174570 A1 | 6/2015 | Loveless et al. |
| 2015/0252482 A1 | 9/2015 | Ono et al. |
| 2015/0345034 A1 | 12/2015 | Sundara et al. |
| 2016/0107154 A1 | 4/2016 | Masel et al. |
| 2016/0108530 A1 | 4/2016 | Masel et al. |
| 2016/0251766 A1 | 9/2016 | Masel et al. |
| 2016/0369415 A1* | 12/2016 | Masel ............... C02F 1/461 |
| 2017/0051419 A1 | 2/2017 | Jang et al. |
| 2017/0128930 A1 | 5/2017 | Masel et al. |
| 2017/0189898 A1 | 7/2017 | Masel et al. |
| 2017/0233881 A1 | 8/2017 | Masel et al. |
| 2018/0030187 A1 | 2/2018 | Wang et al. |
| 2018/0127668 A1 | 5/2018 | Masel |
| 2018/0316063 A1 | 11/2018 | Masel et al. |

FOREIGN PATENT DOCUMENTS

| | | |
|---|---|---|
| JP | H02166128 | 6/1990 |
| JP | H16127647 A | 4/2004 |
| JP | H18351271 A | 12/2006 |
| JP | H19134164 A | 5/2007 |
| JP | H22517059 A | 5/2010 |
| JP | 2012138276 A | 7/2012 |
| KR | 101360269 B1 | 11/2012 |
| WO | 2016039999 A1 | 3/2015 |
| WO | 2016064440 A1 | 4/2016 |
| WO | 2016064447 A1 | 4/2016 |

OTHER PUBLICATIONS

Thomas et al, A Stable Hydroxide-Conducting Polymer, Journal of the American Chemical Society, vol. 134, No. 26, Jun. 2012, pp. 10753-10756 (Year: 2012).*

Office Action dated Sep. 13, 2017 in connection with Canadian Application No. 2,941,423.

Japanese Office Action dated Jan. 31, 2018 in connection with Japanese Patent Application No. 2016-559881.

European Office Action dated Mar. 31, 2018 in connection with European Patent Application No. 15722607.7.

Canadian Office Action dated May 23, 2018 in connection with Canadian Application No. 2,941,423.

Office Action dated Jun. 26, 2018 in connection with Australian Application No. 2015337093.

Deng et al., "Linked Strategy for the Production of Fuels via Formose Reaction", Sci. Reports 3 (2013), p. 1244.

Notice of Acceptance dated Feb. 21, 2019 in connection with Australian application No. 2017246207.

Wendt et al., "Cermet diaphragms and integrated electrode-diaphragm units for advanced alkaline water electrolysis", Int. J. Hydrogen Energy 10(6) (1985), pp. 375-381.

Dewulf et al., "The electrochemical reduction of CO2 to CH4 and C2H4 at Cu/nafion electrodes (solid polymer electrolyte structures)", Catalysis Letters 1 (1988), pp. 73-80.

Kaneco et al., "Electrochemical conversion of carbon dioxide to methane in aqueous NaHCO3 solution at less than 273 K" Electrochimica Acta 48 (2002), pp. 51-55.

Lee et al., "Humidity-sensitive properties of new polyelectrolytes based on the copolymers containing phosphonium salt and phosphine function", J. Applied Polymer Science 89 (2003), pp. 1062-1070.

Tang et al., "Poly(ionic liquid)s as New Materials for CO2 Absorption", Journal of Polymer Science Part A: Polymer Chemistry 43 (2005), pp. 5477-5489.

Siroma et al., "Compact dynamic hydrogen electrode unit as a reference electrode for PEMFCs", J. of Power Sources 156 (2006), pp. 284-287.

Chen et al., "A Concept of Supported Amino Acid Ionic Liquids and Their Application in Metal Scavenging and Heterogeneous Catalysis", J. Am. Chem. Soc. 129 (2007), pp. 13879-13886.

Delacourt et al., "Design of an Electrochemical Cell Making Syngas (CO + H2) from CO2 and H2O Reduction at Room Temperature", J. of the Electrochemical Society 155 (2008), pp. B42-649.

Wang et al., "Water-Retention Effect of Composite Membranes with Different Types of Nanometer Silicon Dioxide" Electrochemical and Solid-State Letters 11 (2008), p. B201.

Luo et al., "Quaternized poly(methyl methacrylate-co-butyl acrylate-co-vinylbenzyl chloride) membrane for alkaline fuel cells", J. Power Sources. 195 (2010), pp. 3765-3771.

Tsutsumi et al., "A Test Method of a PEFC Single Cell with Reference Electrodes", Electrical Engineering in Japan, vol. 172, No. 1 (2010), pp. 1020-1026.

Li et al., "Nickel based electrocatalysts for oxygen evolution in high current density, alkaline water electrolysers", Phys. Chem. Chem. Phys. 13 (2011), pp. 1162-1167.

(56) References Cited

OTHER PUBLICATIONS

Li et al., "Novel anion exchange membranes based on polymerizable imidazolium salt for alkaline fuel cell applications", J. Mater. Chem. 21 (2011), pp. 11340-11346.

Narayanan et al., "Electrochemical Conversion of Carbon Dioxide to Formate in Alkaline Polymer Electrolyte Membrane Cells", J. of the Electrochemical Society 158 (2011), pp. A167-A173.

Pletcher et al., "Prospects for alkaline zero gap water electrolysers for hydrogen production", Int. J. of Hydrogen Energy 36 (2011), pp. 15089-15104.

Rosen et al., "Ionic Liquid—Mediated Selective Conversion of CO2 to CO at Low Overpotentials", Science 334 (2011), pp. 643-644.

Sarode et al., "Designing Alkaline Exchange Membranes from Scratch", The Electrochemical Society, 220th ECS Meeting (2011).

Weber et al., "Thermal and Ion Transport Properties of Hydrophilic and Hydrophobic Polymerized Styrenic Imidazolium Ionic Liquids", J. of Polymer Sci.: Part B: Polymer Physics 49 (2011), pp. 1287-1296.

Zhang et al., "Imidazolium functionalized polysulfone anion exchange membrane for fuel cell application", J. Mater. Chem. 21 (2011), pp. 12744-12752.

Aeshala et al., "Effect of solid polymer electrolyte on electrochemical reduction of CO2", Separation and Purification Technology 94 (2012), pp. 131-137.

Cao et al., "A quaternary ammonium grafted poly vinyl benzyl chloride membrane for alkaline anion exchange membrane water electrolysers with no-noble-metal catalysts", Int. J. of Hydrogen Energy 37 (2012), pp. 9524-9528.

Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.

Leng et al., "Solid-State Water Electrolysis with an Alkaline Membrane", J. Am. Chem. Soc. 134 (2012), pp. 9054-9057.

Marini et al., "Advanced alkaline water electrolysis", Electrochimica Acta (2012), pp. 384-391.

Oh, "Synthesis and Applications of Imidazolium-Based Ionic Liquids and Their Polymer Derivatives", Dissertation at the Missouri University of Science and Technology (2012).

Pletcher et al., "A comparison of cathodes for zero gap alkaline water electrolysers for hydrogen production", Int. J. of Hydrogen Energy 37 (2012), pp. 7429-7435.

Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.

Rosen et al., "In Situ Spectroscopic Examination of a Low Overpotential Pathway for Carbon Dioxide Conversion to Carbon Monoxide", J. of Physical Chemistry 116 (2012), pp. 15307-15312.

Wu et al., "A non-precious metal bifunctional oxygen electrode for alkaline anion exchange membrane cells", J. of Power Sources 206 (2012), pp. 14-19.

Xiao et al., "First implementation of alkaline polymer electrolyte water electrolysis working only with pure water", Energy Environ. Sci. 5 (2012), pp. 7869-7871.

Aeshala et al., "Effect of cationic and anionic solid polymer electrolyte on direct electrochemical reduction of gaseous CO2 to fuel", Journal of CO2 Utilization 3-4 (2013), pp. 49-55.

Carmo et al., "A comprehensive review on PEM water electrolysis", International J. of Hydrogen Energy 38 (2013), pp. 4901-4934.

Chen et al., "Composite Blend Polymer Membranes with Increased Proton Selectivity and Lifetime for Vanadium Redox Flow Batteries", J. of Power Sources 231 (2013), pp. 301-306.

Genovese et al., "A gas-phase electrochemical reactor for carbon dioxide reduction back to liquid fuels", AIDIC Conference Series 11 (2013), pp. 151-160.

Hickner et al., "Anion Exchange Membranes: Current Status and Moving Forward", J. of Polymer Sci. 51 (2013), pp. 1727-1735.

Lin et al., "Alkaline Stable C2-Substituted Imidazolium-Based Anion-Exchange Membranes", Chem. Mater. 25 (2013), pp. 1858-1867.

Mckone et al., "Ni—Mo Nanopowders for Efficient Electrochemical Hydrogen Evolution", ACS Catal. 3 (2013), pp. 166-169.

Prakash et al., "Electrochemical reduction of CO2 over Sn-Nafion coated electrode for a fuel-cell-like device", J. of Power Sources 223 (2013), pp. 68-73.

Rosen et al., "Low temperature electrocatalytic reduction of carbon dioxide utilizing room temperature ionic liquids", Dissertation at the University of Illinois (2013).

Rosen et al., "Water Enhancement of CO2 Conversion on Silver in 1-Ethyl-3-Methylimidazolium Tetrafluoroborate", J. of the Electrochemical Society 160 (2013), pp. H138-H141.

Shironita et al., "Feasibility investigation of methanol generation by CO2 reduction using Pt/C-based membrane electrode assembly for a reversible fuel cell", J. of Power Sources 228 (2013), pp. 68-74.

Shironita et al., "Methanol generation by CO2 reduction at a Pt-Ru/C electrocatalyst using a membrane electrode assembly", J. of Power Sources 240 (2013), pp. 404-410.

Thorson et al., "Effect of Cations on the Electrochemical Conversion of CO2 to CO", J. of the Electrochemical Society 160 (2013), pp. F69-F74.

Wu et al., "Electrochemical Reduction of Carbon Dioxide", J. of the Electrochemical Society 160 (2013), pp. F953-F957.

Wu et al., "A Li-doped Co3O4 oxygen evolution catalyst for non-precious metal alkaline anion exchange membrane water electrolysers", Int. J. of Hydrogen Energy 38 (2013), pp. 3123-3129.

Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.

Ahn et al., "Development of a membrane electrode assembly for alkaline water electrolysis by direct electrodeposition of nickel on carbon papers", Appl. Catal. B 154-155 (2014), pp. 197-205.

Bellini et al., "Energy & Chemicals from Renewable Resources by Electrocatalysis", J. Electrochem. Soc. 161(7) (2014), pp. D3032-D3043.

Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.

Hnat et al., "Polymer anion-selective membrane for electrolytic water splitting: The impact of a liquid electrolyte composition on the process parameters and long-term stability", Int. J. of Hydrogen Energy 39 (2014), pp. 4779-4787.

Ma et al., "Efficient Electrochemical Flow System with Improved Anode for the Conversion of CO2 to CO", J. of the Electrochemical Society 161 (2014), pp. F1124-F1131.

Manolova et al., "New Cathode Materials for the Anion Exchange Membrane Electrolyzer (AEM)", Fuel Cells 14(5) (2014), pp. 720-727.

Parrondo et al., "Degradation of Anion Exchange Membranes Used for Hydrogen Production by Ultrapure Water Electrolysis", Royal Soc. of Chem. Adv. 4 (2014), pp. 9875-9879.

Pavel et al., "Highly Efficient Platinum Group Metal Free Based Membrane-Electrode Assembly for Anion Exchange Membrane Water Electrolysis", Angew. Chem. Int. Ed. 53 (2014), pp. 1378-1381.

Said et al., "Functionalized Polysulfones as an Alternative Material to Improve Proton Conductivity at Low Relative Humidity Fuel Cell Applications", Chemistry and Materials Research 6 (2014), pp. 19-29.

Shi et al., "A novel electrolysis cell for CO2 reduction to CO in ionic liquid/organic solvent electrolyte", Journal of Power Sources 259 (2014) pp. 50-53.

Varcoe et al., "Anion-exchange membranes in electrochemical energy systems", Energy Environ. Sci. 7 (2014), pp. 3135-3191.

Yan et al., "Imidazolium-functionalized poly(ether ketone) as membrane and electrode ionomer for low-temperature alkaline membrane direct methanol fuel cell", Journal of Power Sources 250 (2014), pp. 90-97.

Elbert et al., "Elucidating Hydrogen Oxidation/Evolution Kinetics in Base and Acid by Enhanced Activities at the Optimized Pt Shell Thickness on the Ru Core", ACS Catal. 5 (2015), pp. 6764-6772.

(56) References Cited

OTHER PUBLICATIONS

Kim et al., "Influence of dilute feed and pH on electrochemical reduction of CO2 to CO on Ag in a continuous flow electrolyzer", Electrochimica Acta 166 (2015), pp. 271-276.
Manolova et al., "Development and testing of an anion exchange membrane electrolyser", Int. J. of Hydrogen Energy 40 (2015), pp. 11362-11369.
Schauer et al., "Polysulfone-based anion exchange polymers for catalyst binders in alkaline electrolyzers", Journal of Applied Polymer Science (2015), pp. 1-7.
Ahn et al., "Anion exchange membrane water electrolyzer with an ultra-low loading of Pt-decorated Ni electrocatalyst", Appl. Catal. B 180 (2016), pp. 674-679.
Fang et al., "Hierarchical NiMo-based 3D electrocatalysts for highly-efficient hydrogen evolution in alkaline conditions", Nano Energy 27 (2016), pp. 247-254.
Kraglund et al., "Zero-Gap Alkaline Water Electrolysis Using Ion-Solvating Polymer Electrolyte Membranes at Reduced KOH Concentration", J. Electrochem. Soc. 163(11) (2016), pp. F3125-F3131.
Phillips et al., "Zero gap alkaline electrolysis cell design for renewable energy storage as hydrogen gas", RSC Adv. 6 (2016), pp. 100643-100651.
Strmcnik et al., "Design principles for hydrogen evolution reaction catalyst materials", Nano Energy 29 (2016), pp. 29-36.
Wang et al., "A highly efficient and stable biphasic nanocrystalline Ni—Mo—N catalyst for hydrogen evolution in both acidic and alkaline electrolytes", Nano Energy 22 (2016), pp. 111-119.
Ayers, K. (P.I./Presenter), "Economic Production of Hydrogen through the Development of Novel, High Efficiency Electrocatalysts for Alkaline Membrane Electrolysis", Organization: Proton OnSite, presented Jun. 7, 2017.
Chanda et al., "Optimization of synthesis of the nickel-cobalt oxide based anode electrocatalyst and of the related membrane-electrode assembly for alkaline water electrolysis", J. of Power Sources 347 (2017), pp. 247-258.
Cho et al., "Factors in electrode fabrication for performance enhancement of anion exchange membrane water electrolysis", J. of Power Sources 347 (2017), pp. 282-290.
Hnat et al., "Anion-selective materials with 1,4-diazabicyclo[2.2.2]octane functional groups for advanced alkaline water electrolysis", Electrochimica Acta 248 (2017), pp. 547-555.
Kim et al., "Non-precious metal electrocatalysts for hydrogen production in proton exchange membrane water electrolyzer", Appl. Catal. B 206 (2017), pp. 608-616.
Liu et al., "The effect of membrane on an alkaline water electrolyzer", Int. J. of Hydrogen Energy 42 (2017), pp. 29661-29665.
Serov et al., "(Invited) PGM-Free Oer and HER Electrocatalysts for Alkaline Electrolyzers", Abstract from The Electrochemical Society (2017).
Xu et al., "Preparation and characterization of porous Ni—Mo alloy and its electrocatalytic performance for hydrogen evolution in filter-press type electrolyzer", Springer published online Dec. 11, 2017.
Zhang et al., "Interface engineering: The Ni(OH)2/MoS2 heterostructure for highly efficient alkaline hydrogen evolution", Nano Energy 37 (2017), pp. 74-80.
Zhiani et al., "In situ cathode polarization measurement in alkaline anion exchange membrane water electrolyzer equipped with a PdNiFeCo/C-Ceria hydrogen evolution electrocatalyst", Int. J. of Hydrogen Energy 42 (2017), pp. 26563-26574.
Ito et al., "Investigations on electrode configurations for anion exchange membrane electrolysis", J. Appl. Electrochem. Published online Feb. 8, 2018.
Kang et al., "Stability of a Cu0.7Co2.3O4 Electrode during the Oxygen Evolution Reaction for Alkaline Anion-Exchange Membrane Water Electrolysis", J. of the Korean Phys. Soc. 72(1) (2018), pp. 52-56.

Park et al., "Chemically durable polymer electrolytes for solid-state alkaline water electrolysis", J. of Power Sources 375 (2018), pp. 367-372.
Vincent et al., "Low cost hydrogen production by anion exchange membrane electrolysis: A review", Renewable and Sustainable Energy Reviews 81 (2018), pp. 1690-1704.
Zeng et al., "NiCo2O4 nanowires@MnOx nanoflakes supported on stainless steel mesh with superior electrocatalytic performance for anion exchange membrane water splitting", Electrochem. Comm. 87 (2018), pp. 66-70.
"Sponge Metal Catalysts: Solutions for the Synthesis of Pharmaceuticals, Bulk and Fine Chemicals", Sponge Metal Catalysts Manufacturing, Johnson Matthey Process Technologies (brochure).
Kawaken Fine Chemicals Co., Ltd., Search results for "Sponge Metal Catalyst", https://www.kawakenfc.co.jp/en/products/fine/index.php/search?cell003=Sponge+Metal+Catalyst&label=1; last accessed Mar. 4, 2018.
Nikko Rica Co., Business and Product Information, Sponge Metal Catalysts, http://www.nikko-rica.co.jp/en/business/s_metal/; last accessed Mar. 4, 2018.
Wikipedia article "Raney nickel", https://en.wikipedia.org/wiki/Raney_nickel; last accessed Mar. 4, 2018.
International Search Report and Written Opinion dated Jul. 6, 2015 in connection with International Application PCT/US2015/014328.
International Search Report and Written Opinion dated Jul. 20, 2015 in connection with International Application PCT/US2015/026507.
Korean Office Action dated Sep. 13, 2016 in connection with Korean Patent Application No. 10-2016-7022952.
Partial International Search Report dated Nov. 24, 2016 in connection with International Application PCT/US2016/045210.
International Search Report and Written Opinion dated Jan. 20, 2017 in connection with International Application PCT/US2016/045210.
International Preliminary Report on Patentability dated May 4, 2017 in connection with International Application PCT/US2015/026507.
International Preliminary Report on Patentability dated May 4, 2017 in connection with International Application No. PCT/US2015/014328.
Korean Office Action dated May 29, 2017 in connection with Korean Patent Application No. 10-2016-7022952.
Partial International Search Report dated on Jun. 22, 2017 in connection with International Application PCT/US2017/025624.
Australian Office Action dated Jun. 29, 2017 in connection with Australian Patent Application No. 2015337093.
International Search Report and Written Opinion dated Jul. 12, 2017 in connection with International Application No. PCT/US2017/025628.
International Search Report and Written Opinion dated Jul. 28, 2017 in connection with International Application No. PCT/US2017/025626.
International Search Report and Written Opinion dated Aug. 16, 2017 in connection with International Application No. PCT/US2017/025624.
Chinese Office Action dated Dec. 24, 2018 in connection with Chinese App. No. 2015800151216.
Australian Office Action dated Jan. 23, 2019 in connection with Australian App. No. 2017246206.
Canadian Office Action dated Feb. 8, 2019 in connection with Canadian App. No. 2,941,423.
Komatsu et al., "Preparation of Cu-Solid Polymer Electrolyte Composite Electrodes and Application to Gas-Phase Electrochemical Reduction of CO2", Electrochimica Acta 40(6) (1995), pp. 745-753.
Sata et al., "Preparation and Properties of Anion Exchange Membranes Having Pyridinium or Pyridinium Derivatives as Anion Exchange Groups", Journal of Polymer Science Part A: Polymer Chemistry 36(1) (1998), pp. 49-58.
Torres et al., "Carbonate Species as OH—Carriers for Decreasing the pH Gradient between Cathode and Anode in Biological Fuel Cells" Env. Science & Tech. 42(23) (2008), pp. 8773-8777.

(56) References Cited

OTHER PUBLICATIONS

Ganesh, "Conversion of Carbon Dioxide into Methanol—a potential liquid fuel: Fundamental challenges and opportunities (a review)" Renewable and Sustainable Energy Reviews 31 (2014), pp. 221-257.
Office Action dated Apr. 25, 2019 in connection with Chinese App. No. 201780020302.7.
Wilson et al., "Thin-film catalyst layers for polymer electrolyte fuel cell electrodes", J. of Applied Electrochem. 22 (1992), pp. 1-7.
Parrondo et al, "Hydrogen Production by Alkaline Membrane Water Electrolysis", 224th ECS Meeting, (2013).
Office Action dated Mar. 20, 2020 issued in connection with European application No. 16782111.5.
Office Action dated May 7, 2020 issued in connection with European application No. 15722607.7.
Office Action dated May 8, 2020 issued in connection with European application No. 17723165.1.
Office Action dated May 19, 2020 issued in connection with Japanese application No. 2018-145931.

* cited by examiner

WATER ELECTROLYZERS EMPLOYING ANION EXCHANGE MEMBRANES

CROSS-REFERENCE TO RELATED APPLICATIONS

The present application is a continuation-in-part of U.S. patent application Ser. No. 15/406,909 filed on Jan. 16, 2017, entitled "Water Electrolyzers". The '909 application is, in turn a continuation-in-part of U.S. patent application Ser. No. 15/400,775 filed on Jan. 6, 2017 (now U.S. Pat. No. 9,849,450 issued on Dec. 26, 2017), entitled "Ion-Conducting Membranes". The '775 application is, in turn, a continuation-in-part of U.S. patent application Ser. No. 15/090,477 filed on Apr. 4, 2016 (now U.S. Pat. No. 9,580,824 issued on Feb. 28, 2017), also entitled "Ion-Conducting Membranes". The '477 application is, in turn, a continuation-in-part of U.S. patent application Ser. No. 14/704,935 filed on May 5, 2015 (now U.S. Pat. No. 9,370,773 issued on Jun. 21, 2016), also entitled "Ion-Conducting Membranes". The '935 application was, in turn, a continuation-in-part of international application No. PCT/US2015/014328, filed on Feb. 3, 2015, entitled "Electrolyzer and Membranes". The '328 international application claimed priority benefits from U.S. provisional patent application Ser. No. 62/066,823, filed on Oct. 21, 2014

The '935 application was also a continuation-in-part of International Application No. PCT/US2015/026507, filed on Apr. 17, 2015, entitled "Electrolyzer and Membranes". The '507 international application also claimed priority benefits from U.S. provisional patent application Ser. No. 62/066,823 filed Oct. 21, 2014.

The present application is also a continuation-in-part of U.S. patent application Ser. No. 15/922,883 filed on Mar. 15, 2018 entitled "Water Electrolyzers Employing Anion Exchange Membranes". The '883 application is, in turn, a continuation-in-part of the '909 application, which is, in turn a continuation-in-part of the '775 application (now the '450 patent), which is, in turn, a continuation-in-part of the '477 application (now the '824 patent), which is, in turn, a continuation-in-part of the '935 application (now the '773 patent), which was, in turn, a continuation-in-part of the '328 and '507 international applications, both of which claimed priority benefits from the '823 provisional patent application.

The '909 parent application, the '883 parent application, the '775 application, the '477 application, the '935 application, the '328 and '507 international applications, and the '823 provisional application are each hereby incorporated by reference herein in their entirety.

This application is also related to U.S. patent application Ser. No. 13/445,887, filed Apr. 12, 2012, entitled "Electrocatalysts for Carbon Dioxide Conversion".

STATEMENT OF GOVERNMENT INTEREST

This invention was made, at least in part, with U.S. government support under ARPA-E Contract No. DE-AR-0000684. The government has certain rights in the invention.

FIELD OF THE INVENTION

The field of the invention is electrochemistry. The devices, systems and compositions described herein involve the electrolysis of water.

BACKGROUND OF THE INVENTION

The electrolysis of water is presently used as a source of hydrogen in, for example, hydrogen filling stations and chemical plants, and as a way of storing excess renewable energy using a technology called "power to gas".

There are two main types of low temperature electrolyzers: proton exchange membrane (PEM) electrolyzers and alkaline water electrolyzers. PEM electrolyzers are able to operate at current densities around 1 A/cm$^2$ at cell voltages less than 2 V, and can be turned on and off quickly. Unfortunately, PEM electrolyzers typically require the use of precious metal catalysts, such as platinum or iridium. This is a significant economic limitation.

In contrast, the present generation of alkaline water electrolyzers do not require the use of precious metals; instead, base metal catalysts can be used. Unfortunately, the present generation of alkaline water electrolyzers typically operate at lower current densities than PEM electrolyzers. This raises the capital equipment cost.

For example, U.S. Pat. No. 4,445,994 notes that alkaline water electrolyzers operate at 200-300 mA/cm$^2$ (0.2-0.3 A/cm$^2$) at cell potentials of 1.8-2 V. The '994 patent also indicates that currents of 1 A/cm$^2$ can be obtained by increasing the cell temperature to 110° C., but as pointed out in U.S. patent application Ser. No. 15/029,952 (published as US2016/0237578), the upper temperature limit of a practical alkaline water electrolyzer is 80-90° C., since excessive corrosion is observed at above 80-90° C. in these high pH systems (for example, 1 M KOH electrolyte.) Recently, U.S. patent application Ser. No. 15/103,924 (published as US2016/0312371) disclosed an improved electrolyzer design that can obtain 40 A/dm$^2$=0.4 A/cm$^2$ at 80° C. and 1.9V. This is a significant improvement, but still below the performance of a PEM electrolyzer.

Anion Exchange Membrane (AEM) water electrolyzers have also been started to be discussed in the literature as replacements for conventional alkaline water electrolyzers. A recent review by Vincent and Bessarabov (Renewable and Sustainable Energy Reviews, volume 81, pages 1690-1704 (2018)) states that "few research articles (less than 20) have been published on AEM water electrolysis."

SUMMARY OF THE INVENTION

An alkaline electrolyzer design with base metal catalysts can provide even higher current densities than those reported in U.S. patent application Ser. No. 15/103,924 (published as US2016/0312371) at temperatures of 80° C. or less. The device comprises:
(a) an anode comprising a quantity of anode catalyst;
(b) a cathode comprising a quantity of cathode catalyst, said cathode having a cathode reactant introduced thereto via at least one cathode reactant flow channel;
(c) a polymer electrolyte membrane interposed between said anode and said cathode; and
(d) a source of electrical energy that applies a voltage between the anode and cathode.

The anode and cathode catalysts comprise base metal catalysts.

Preferably, the ion conducting membrane has an area specific resistance in 1 M KOH at 60° C. below 0.37 Ω-cm$^2$, preferably the ASR should be below 0.2 Ω-cm$^2$, more preferably the ASR should be below 0.1 Ω-cm$^2$, most preferably the ASR should be below 0.05 Ω-cm$^2$.

Preferably the ion conducting membrane comprises a copolymer of styrene and vinylbenzyl-$R_s$, wherein $R_s$ is a positively charged cyclic amine group.

More preferably, the ion conducting membrane comprises a polymer of styrene, vinylbenzyl-$R_s$, and vinylbenzyl-$R_x$ wherein $R_s$ is a positively charged cyclic amine group, $R_x$ is at least one constituent selected from the group consisting Cl, OH, and a reaction product between an OH or Cl and a species other than a simple amine or a cyclic amine, and the total weight of the vinylbenzyl-$R_x$ groups is greater than 0.3% of the total weight of the membrane.

In a preferred embodiment, the total weight of the vinylbenzyl-$R_s$ groups is between 15% and 90% of the total weight of membrane.

In a preferred embodiment, $R_s$ is selected from the group consisting of imidazoliums, pyridiniums, pyrazoliums, pyrrolidiniums, pyrroliums, pyrimidiums, piperidiniums, indoliums, triaziniums, preferably imidazoliums and pyridiniums.

In a preferred embodiment of the polymeric composition, $R_s$ is an imidazolium. The imidazolium is preferably an alkylimidazolium, more preferably tetramethylimidazolium.

In a preferred embodiment of the polymeric composition, $R_s$ is a pyridinium. The pyridinium is preferably an alkylpyridinium In a preferred embodiment, the polymer will have a molecular weight between 1,000 and 10,000,000 atomic units (A.U.) preferably between 10,000 and 1,000,000 A.U., most preferably between 25,000 and 250,000 A.U.

In a preferred embodiment, the polymeric composition is in the form of a membrane. The membrane has a preferred thickness of from 10 to 300 micrometers.

DETAILED DESCRIPTION OF ILLUSTRATIVE EMBODIMENT(S)

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those familiar with the technology involved here. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as a person familiar with the technology here would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "polymer electrolyte membrane" refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation NAFION from E. I. du Pont de Nemours and Company (DuPont) of Wilmington, Del.

The term "anion exchange membrane electrolyzer" as used here refers to an electrolyzer with an anion-conducting polymer electrolyte membrane separating the anode from the cathode.

The term "Hydrogen Evolution Reaction," also called "HER," as used here refers to the electrochemical reaction $2H^+ + 2e^- \rightarrow H_2$.

The term "MEA" as used here refers to a membrane electrode assembly.

The term "Millipore water" is water that is produced by a Millipore filtration system with a resistivity of at least 18.2 megaohm-cm.

The term "imidazolium" as used here refers to a positively charged ligand containing an imidazole group. This includes a bare imidazole or a substituted imidazole. Ligands of the form:

where $R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "pyridinium" as used here refers to a positively charged ligand containing a pyridine group. This includes a bare pyridine or a substituted pyridine. Ligands of the form:

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used here refers to a positively charged ligand containing phosphorous. This includes substituted phosphorous. Ligands of the form:

$P^+(R_{12}R_{13}R_{14}R_{15})$, where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "positively charged cyclic amine" as used here refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "simple amine" as used here refers to a species of the form $N(R_{16}R_{17}R_{18})$, where $R_{16}$-$R_{18}$ are each independently selected from hydrogen, linear alkyls, branched alkyls, cyclic alkyls, heteroalkyls, aryls, heteroaryls, alkylaryls, and heteroalkylaryls, but not polymers.

The term "precious metal" as used here refers to one or more of Ru, Rh, Pd, Ag, Re, Os, Ir, Pt, and Au.

The term "base metal catalyst" as used here refers to a catalyst that is substantially free of precious metals.

Specific Description

Figure 1:
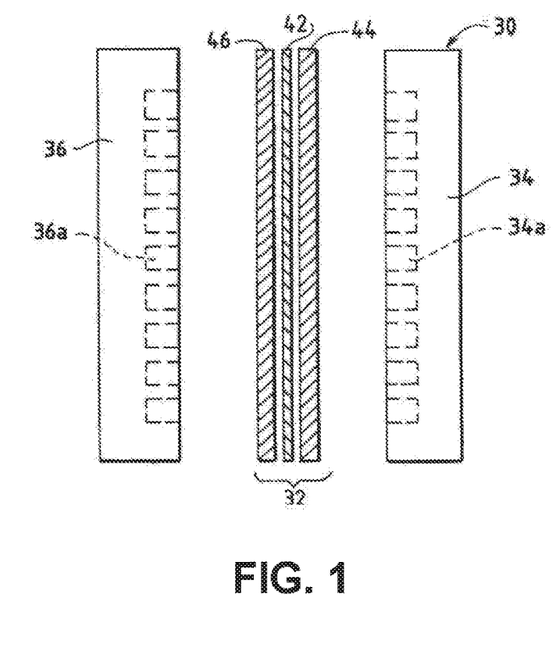
FIG. 1 is an exploded side view of a fuel cell hardware assembly including a membrane electrode assembly interposed between two fluid flow field plates having reactant flow channels formed in the major surfaces of the plates facing the electrodes.

FIG. 1 illustrates a fuel cell hardware assembly 30, which includes a membrane electrode assembly 32 interposed between rigid flow field plates 34 and 36, typically formed of graphite or a graphite composite material. Membrane electrode assembly 32 consists of a polymer electrolyte (ion exchange) membrane 42 interposed between two electrodes, namely, anode 44 and cathode 46. Anode 44 and cathode 46 are typically formed of porous electrically conductive sheet material, such as carbon fiber paper, and have planar major surfaces. Electrodes 44 and 46 have a thin layer of catalyst material disposed on their major surfaces at the interface with membrane 42 to render them electrochemically active.

As shown in FIG. 1, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the anode reactant stream (if any) and cathode reactant stream (comprising water, in the case of the present water electrolyzer,) respectively.

Figure 2:
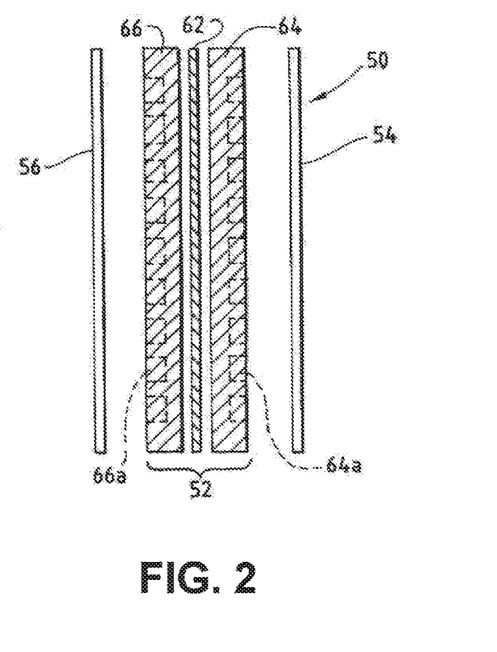
FIG. 2 is an exploded side view of a fuel cell hardware assembly including a membrane electrode assembly having integral reactant flow channels interposed between two separator layers.

Turning to FIG. 2, a fuel cell hardware assembly 50 employs a membrane electrode assembly 52 having integral reactant fluid flow channels. Fuel cell hardware assembly 50 includes membrane electrode assembly 52 interposed between lightweight separator layers 54 and 56, which are substantially impermeable to the flow of reactant fluid therethrough. Membrane electrode assembly 52 consists of a polymer electrolyte (ion exchange) membrane 62 interposed between two electrodes, namely, anode 64 and cathode 66. Anode 64 and cathode 66 are formed of porous electrically conductive sheet material, such as carbon fiber paper. Electrodes 64 and 66 have a thin layer of catalyst material disposed on their major surfaces at the interface with membrane 62 to render them electrochemically active.

As shown in FIG. 2, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the anode and cathode reactant streams, respectively.

During operation, reactants or a solution containing reactants is fed into the cell. Then a voltage is applied between the anode and the cathode, to promote an electrochemical reaction.

Without further elaboration, it is believed that persons familiar with the technology involved here using the preceding description can utilize the claimed electrolyzer to full extent. The following examples are illustrative only, and are not meant to be an exhaustive list of all possible embodiments, applications or modifications of the claimed electrolyzer.

Specific Example 1

The objective of this example was to demonstrate an alkaline electrolyzer with base metal catalysts that is able to obtain a current per unit area of the cell of 1 A/cm² at an applied voltage of 2 V or less and temperatures of 80° C. or less. The cell contained:
  (a) an anode comprising a quantity of anode catalyst, said anode having an anode reactant introduced thereto via at least one anode reactant flow channel;
  (b) a cathode comprising a quantity of cathode catalyst, said cathode having a cathode reactant introduced thereto via at least one cathode reactant flow channel;
  (c) a polymer electrolyte membrane interposed between said anode and said cathode; and
  (d) a source of electrical energy that applies a voltage between the anode and cathode.

The anode and cathode catalysts did not include precious metals and the polymer electrolyte membrane comprises a polymer of styrene, vinyl-benzyl-chloride (VBC) and vinyl-benzyl-$R_s$, where $R_s$ is a positively charged cyclic amine.

A membrane was prepared as set forth below.

The first inhibitor-free VBC was prepared by adding a volume V of VBC, (Sigma-Aldrich, Saint Louis, Mo.) and a volume equal to V/4 of 4% aqueous sodium hydroxide into a separatory funnel, followed by agitating the funnel to mix the water and VBC, then decanting the VBC. The process was repeated five times until the water layer did not show visible color change. The procedure was repeated using pure water instead of sodium hydroxide solution until the water layer pH was neutral. Washed VBC was placed into a freezer overnight before weighing to convert residual water to mainly ice, and the ice was then separated from styrene by filtration or decantation.

Next, inhibitor-free styrene was prepared by feeding styrene (Sigma-Aldrich) through a 60 mL syringe (HSW, Tuttlingen, Del.) packed with Sigma-Aldrich 311340 Inhibitor remover.

Poly(4-vinylbenzyl chloride-co-styrene) was then synthesized by heating a solution of inhibitor-free styrene (Sigma-Aldrich) (172.3 g, 1.65 mol) and 4-vinylbenzyl chloride (Sigma-Aldrich) (143.1 g, 0.94 mol) in chlorobenzene (Sigma-Aldrich) (250 g) at 60-65° C. in an oil bath for 22 hours under nitrogen gas with AIBN (α,α'-Azoisobutyronitrile, Sigma-Aldrich) (2.9635 g, 0.94 wt % based on the total monomers weight) as initiator. The copolymer was precipitated in methanol, then washed thoroughly and dried at 60° C. overnight.

Next 1,2,4,5-tetramethylimidazole (TCI, Japan) (3.700 g, 0.0298 mol), above-synthesized poly(4-VBC-co-St) (10 g), anhydrous ethanol (17 g, Sigma-Aldrich), anhydrous toluene (12.5 g, Sigma-Aldrich), divinylbenzene (DVB) (0.2 g, 0.00154 mol in 1 g ethanol) and AIBN (0.00301 g in 0.97 g ethanol) were mixed under the protection of nitrogen flow. The mixture was stirred and heated to 78° C. for about 1 hour. When the solution turned clear, the reaction temperature was decreased to 55° C. and maintained for 71 hours to obtain the polymer.

The membranes were prepared by casting the polymer solutions prepared above directly onto a polyethylene terephthalate (PET) liner. The thickness of the solution on the liner was controlled by a film applicator (MTI Corporation, Richmond, Calif.) with an adjustable doctor blade. The membranes were then dried in a vacuum oven with temperature increased to 70° C. and held for 1 hour. After one more hour in the vacuum oven with temperature slowly decreased, the membrane was taken out of the oven and put inside a 1 M KOH solution overnight, during which time the membrane fell from liner. The KOH solution was changed twice, each with a couple of hours of immersion, such that the membrane chloride ions were substantially completely exchanged, so that the membranes were converted into the hydroxide form. This also made the polymer insoluble in most solvents, suggesting that some residual vinyl benzyl chlorides and/or the hydroxides from the soaking solution have reacted with some other species to form something insoluble.

NMR spectroscopy of the polymer solution from before membrane casting indicates that in the polymer about 40% of the VBC did not react with the tetramethylimidazole. The weight of the VBC that did not react with the tetramethylimidazole represented about 14% of the total weight of the membrane. Thus, the KOH-soaked, ion exchanged membrane is actually a terpolymer of styrene, vinylbenzyl chloride (and/or hydroxide) and vinylbenzyl tetramethylimidazolium, with negative counterions of hydroxide (and perhaps traces of residual chloride.)

A cathode was prepared as follows: 100 mg of NiFeCo nanoparticles (US Research Nanomaterials, Inc., Houston, Tex.) were suspended in 2 ml of isopropanol, 1 ml of deionized water and 0.2 ml of 5% dispersion of ionomer available under the trade designation NAFION (DuPont.) The mixture was ultrasonicated in a water bath for 10 minutes. The cathode ink was spray coated onto a 5 cm×5 cm of Sigracet 39 BC carbon paper (SGL Group, Meitingen Germany). The electrode was dried at 80° C. for 20 minutes in an oven and cut into 4 pieces of 2.5 cm×2.5 cm for testing. The catalyst loading was about 3 mg/cm$^2$.

The anode for the oxygen evolution reaction was prepared in a similar way but with NiFeOx nanoparticles (US Research Nanomaterials, Inc.) instead of NiFeCo alloy nanoparticles. The catalyst ink was spray coated onto 6 cm×6 cm stainless steel fiber cloth (AISI 316L-WNR, Bekaert, Zwevegem, Belgium.) The electrode was dried at 80° C. for 20 minutes in an oven and cut into 4 pieces of 3 cm×3 cm for testing. The actual loading was about 2 mg/cm$^2$.

The membrane prepared above was sandwiched between the NiFeCo cathode and NiFeOx anode as described above, and mounted into 5 cm$^2$ fuel cell hardware (Fuel Cell Technologies, Albuquerque, N. Mex.). The anode graphite flow field was replaced with a Ni flow field to alleviate the carbon corrosion in the anode. 1 M KOH was fed at 2 ml/min to the cathode and anode chambers from the same container with the chamber outputs going to two separation units, which units were used to separate gas from liquid before the recirculating liquid re-entered the main container. The cell was heated and maintained at 60° C. with a PID (proportional-integral-derivative) controller. The cell was held at constant current density of 1 A/cm$^2$ and the cell voltage was monitored.

Figure 3:
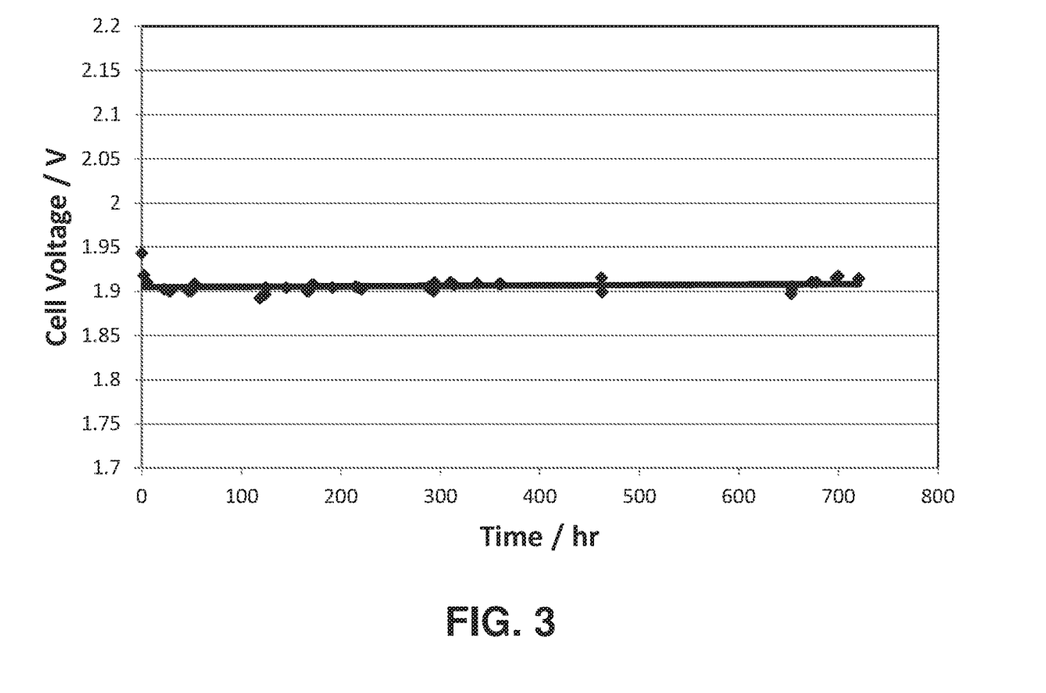
FIG. 3 is a plot of cell voltage as a function of time for the test described in Specific Example 1.

FIG. 3 shows the results of the experiments. Notice that one can maintain 1 A/cm$^2$ at 60° C. at about 1.9 volts for hundreds of hours.

Experiments have also been conducted at 80° C. In that case the current rose to 1.6 A/cm$^2$.

It is useful to compare these results to those previously reported. In U.S. Pat. No. 4,445,994, the applicants were able to obtain 1 A/cm$^2$, but needed to operate at 110° C. to obtain that current level. Kamei et al. U.S. patent application Ser. No. 15/029,952 (published as US2016/0237578) indicates that such a high temperature is not practical.

U.S. patent application Ser. No. 15/103,924 (published as US2016/0312371) reported a current density of only 0.4 A/cm$^2$ at 80° C. (the practical temperature limit) at a voltage of 1.9V.

The present water electrolyzer showed 1 A/cm$^2$ at 60° C. and a cell voltage of 1.9 V. It also showed 1.6 A/cm$^2$ at 80° C. and a cell voltage of 1.9 V. Thus, the performance exceeded that of the previously reported alkaline electrolyzers at practical conditions.

Table 1 compares the area specific resistance (ASR) of the membrane reported here to those used previously. Notice that the ASR of the membranes used previously. The low ASR is believed to be important to achieving the proposed performance.

TABLE 1

ASR measured for several membranes at 60° C. in 1M KOH

| | \multicolumn{7}{c}{Membrane} | | | | | | |
|---|---|---|---|---|---|---|---|
| | Example 1 | FAS-50 | Nafion 115 | FAPQ | AMI-7001 | PBI | ACM |
| Thickness | 50 μm | 50 μm | 125 μm | 75 μm | 450 μm | 50 μm | 110 μm |
| ASR Ω-cm² | 0.045 | 0.37 | 0.52 | 0.83 | 2.0 | 8.3 | >50 |

Note that raising the ASR of the membrane from 0.045 to 0.37 Ω-cm² would increase the voltage to maintain 1 A/cm² by $$(1\ A/cm^2)*(0.37\ \Omega\text{-}cm^2 - 0.045\ \Omega\text{-}cm^2) = 0.325\ V$$

which is undesirable. A similar calculation shows that a ASR of 0.2 Ω-cm² would raise the voltage by 0.155 V, and ASR of 0.1 Ω-cm² would raise the voltage by 0.055 V. Consequently, it was concluded that the ASR of the membrane in 1 M KOH at 60° C. should be below 0.37 Ω-cm², preferably the ASR should be below 0.2 Ω-cm², more preferably the ASR should be below 0.1 Ω-cm², most preferably the ASR should be below 0.05 Ω-cm²

The results above show that an alkaline water electrolyzer with:

(a) an anode comprising a quantity of anode catalyst;
(b) a cathode comprising a quantity of cathode catalyst, said cathode having a cathode reactant introduced thereto via at least one cathode reactant flow channel;
(c) a polymer electrolyte membrane interposed between said anode and said cathode; and
(d) a source of electrical energy that applies a voltage between the anode and cathode, in which the membrane has an ASR below 0.37 ohm-cm² is preferred.

The membrane preferably comprises a terpolymer of styrene, vinylbenzyl-$R_s$ and vinylbenzyl-$R_x$ where $R_s$ is a positively charged cyclic amine group and $R_x$ is selected from the group consisting of Cl, OH, and a reaction product between an OH or Cl and a species other than a simple amine or a cyclic amine, can provide electrolyzer performance superior to that of the alkaline electrolyzers reported previously.

In co-owned U.S. patent application Ser. No. 15/400,775 filed on Jan. 6, 2017 (now U.S. Pat. No. 9,849,450 issued on Dec. 26, 2017), it was shown that an electrolyzer can still operate when the total weight of the vinylbenzyl-$R_x$ groups is less than 0.3% of the total weight of the membrane, but the mechanical stability was poor. The '775 application also shows that it is preferable for the total weight of the vinylbenzyl-$R_x$ groups to be between 0.3% and 25% of the total weight of the membrane.

More preferably, the total weight of the vinylbenzyl-$R_x$ groups is between 1% and 15% of the total weight of the membrane.

The data set forth in co-pending and co-owned U.S. patent application Ser. No. 15/090,477 (published as US2016/0251766) shows the total weight of the vinylbenzyl-$R_s$ groups is preferably at least 15% of the total weight of the membrane, preferably between 15% and 90% of the total weight of the membrane, most preferably between 25% and 80% of the total weight of the membrane.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A water electrolyzer comprising:
   (a) an anode comprising a quantity of anode catalyst;
   (b) a cathode comprising a quantity of cathode catalyst, said cathode having a cathode reactant introduced thereto via at least one cathode reactant flow channel;
   (c) an anion exchange membrane interposed between said anode and said cathode; and
   (d) a source of electrical energy that applies a voltage between the anode and cathode,
   wherein said anion exchange membrane has an area specific resistance of about 0.045 ohm-cm² in 1 M KOH at 60° C.

2. The water electrolyzer of claim 1, wherein said polymeric membrane has a thickness of from 10 to 300 micrometers.

3. The water electrolyzer of claim 1, wherein said anion exchange membrane comprises a polymer comprising styrene and vinylbenzyl-$R_s$, wherein $R_s$ is a positively charged cyclic amine group.

4. The water electrolyzer of claim 3, wherein said polymer is a terpolymer of styrene, vinylbenzyl-$R_s$, and vinylbenzyl-$R_x$, wherein $R_x$ is at least one constituent selected from the group consisting of Cl, OH, and a reaction product between an OH or Cl and a species other than a simple amine or a cyclic amine, and wherein the total weight of the vinylbenzyl-$R_x$ groups is at least 0.3% of the total weight of the polymer electrolyte membrane.

5. The water electrolyzer of claim 3, wherein the total weight of the vinylbenzyl-$R_s$, groups in said polymer electrolyte membrane is between 15% and 90% of the total weight of the membrane.

6. The water electrolyzer of claim 3, wherein the total weight of the vinylbenzyl-$R_x$ groups in said polymer electrolyte membrane is between 0.3% and 25% of the total weight of the membrane.

7. The water electrolyzer of claim 6, wherein the total weight of the vinylbenzyl-$R_x$ groups in said polymer electrolyte membrane is between 1% and 15% of the total weight of the membrane.

8. The water electrolyzer of claim 3, wherein said positively charged cyclic amine group is tetramethylimidazolium.

9. The water electrolyzer of claim 1, wherein said anode catalyst comprises a base metal catalyst.

10. The water electrolyzer of claim 1, wherein said cathode catalyst comprises a base metal catalyst.

11. The water electrolyzer of claim 1, wherein said anode catalyst consists essentially of one or more base metal catalysts.

12. The water electrolyzer of claim 1, wherein said cathode catalyst consists essentially of one or more base metal catalysts.

13. The water electrolyzer of claim 1, wherein said cathode reactant comprises water.

* * * * *